United States Patent [19]

Maroschak

[11] 4,003,685
[45] Jan. 18, 1977

[54] APPARATUS FOR MOLDING PLASTIC PIPE WITH ENLARGED PORTIONS FORMED THEREIN

[76] Inventor: Ernest J. Maroschak, P.O. Box 878, Roseboro, N.C. 28382

[22] Filed: June 13, 1975

[21] Appl. No.: 586,737

Related U.S. Application Data

[60] Division of Ser. No. 513,279, Oct. 9, 1974, Pat. No. 3,919,367, which is a continuation-in-part of Ser. No. 271,225, July 13, 1972, Pat. No. 3,891,733, and a continuation-in-part of Ser. No. 316,825, Dec. 20, 1972, Pat. No. 3,859,025.

[52] U.S. Cl. ........................ 425/135; 425/326 B; 425/DIG. 206
[51] Int. Cl.² ........................................ B29D 23/03
[58] Field of Search ........ 425/135, 149, 150, 162, 425/303, 326 B, 392, 396, DIG. 206, DIG. 215, DIG. 231

[56] References Cited

UNITED STATES PATENTS

| | | | |
|---|---|---|---|
| 3,092,874 | 6/1963 | Fallwell | 425/135 |
| 3,188,690 | 6/1965 | Zieg | 425/396 |
| 3,286,305 | 11/1966 | Seckel | 425/396 |
| 3,520,020 | 7/1970 | Williams et al. | 425/149 |
| 3,564,087 | 2/1971 | Ruckberg | 425/326 B |
| 3,711,232 | 1/1973 | Van Zon | 425/150 |
| 3,919,367 | 11/1975 | Maroschak | 264/40 |

Primary Examiner—Robert D. Baldwin
Attorney, Agent, or Firm—Bell, Seltzer, Park & Gibson

[57] ABSTRACT

Apparatus for molding a plastic pipe having spaced apart enlarged sleeve portions formed therein along its length and wherein a tube of hot plastic material is continuously extruded into a blow molding zone formed by a series of cooperating pairs of forwardly moving die blocks having concave inner surfaces defining a body-forming mold cavity and an adjacent enlarged sleeve-forming mold cavity of internal dimension greater than that of the body-forming mold cavity, and wherein internal fluid pressure is applied within the hot plastic tube during forward movement of the same through the blow molding zone to expand the tube and mold the same against the body-forming and enlarged sleeve-forming mold cavities to thereby form the tube into body portions of predetermined tubular dimension and adjacent relatively enlarged sleeve portions. To avoid blowing holes in the hot plastic tube as the tube is expanded and stretched to conform with the enlarged sleeve-forming mold cavity to form enlarged sleeve portions in the tube, the internal fluid pressure in the hot plastic tube is periodically lowered as the hot plastic tube is received within the enlarged sleeve-forming mold cavity.

9 Claims, 23 Drawing Figures

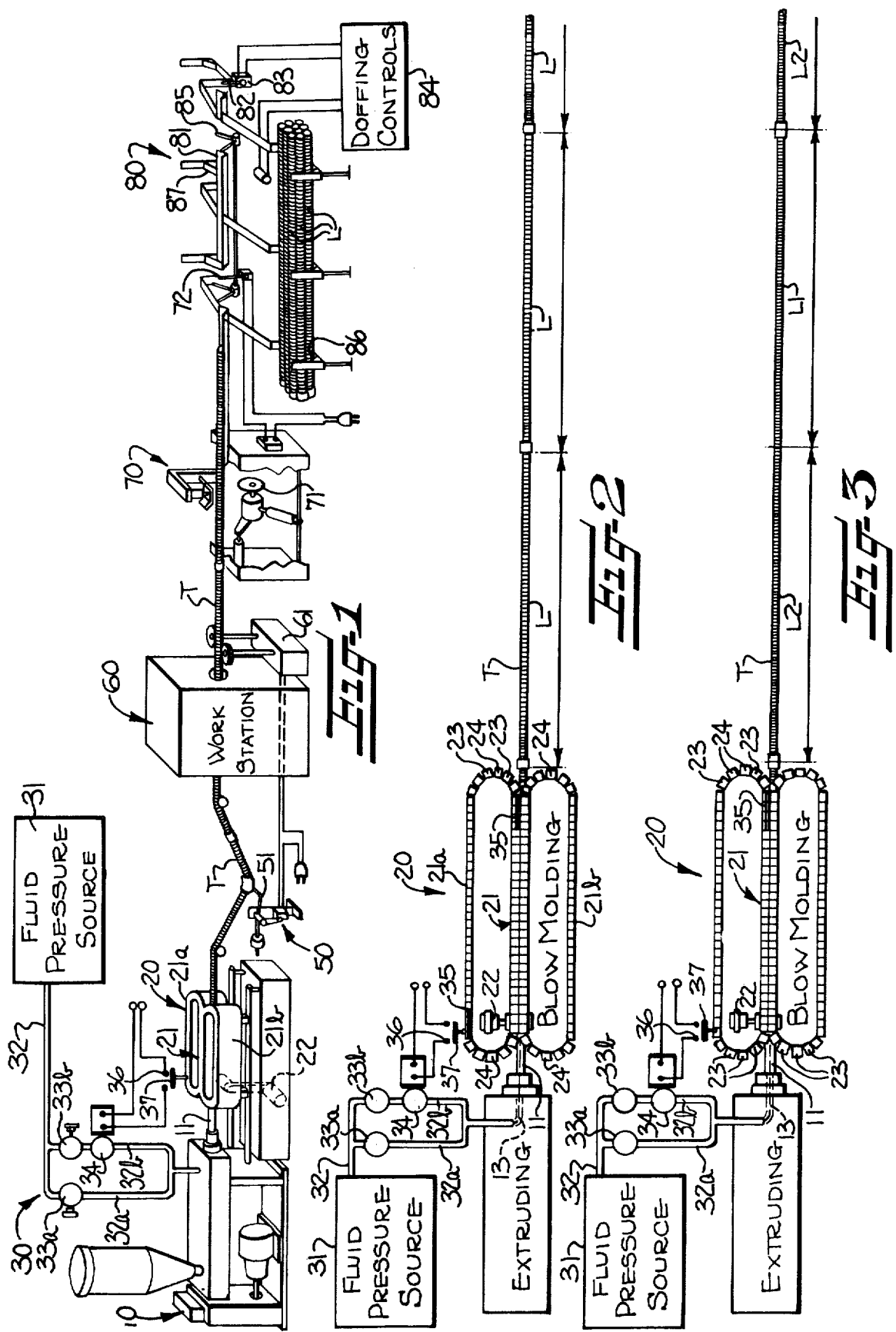

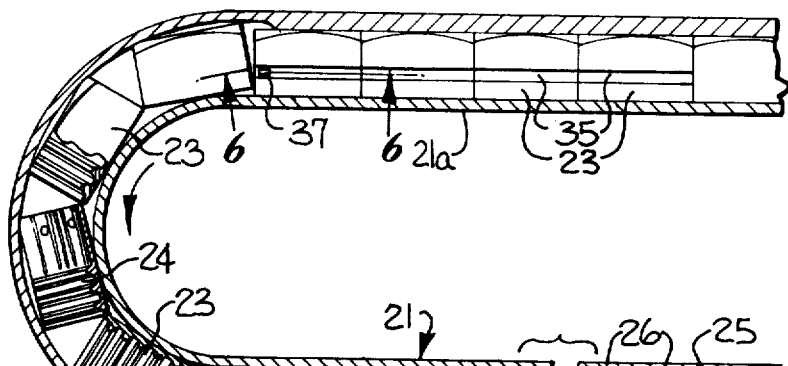
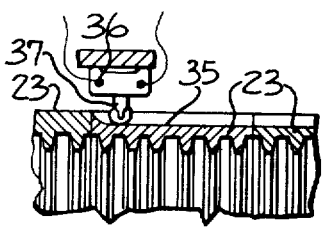
Fig-6
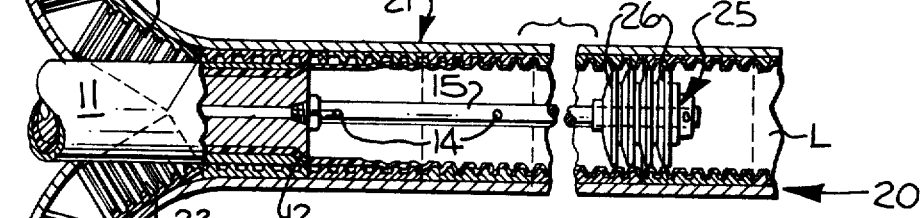
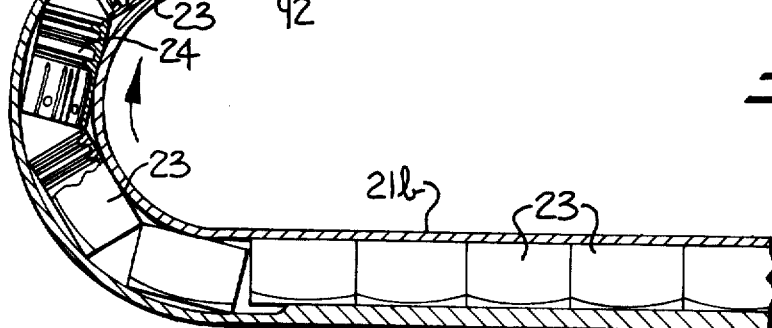
Fig-4
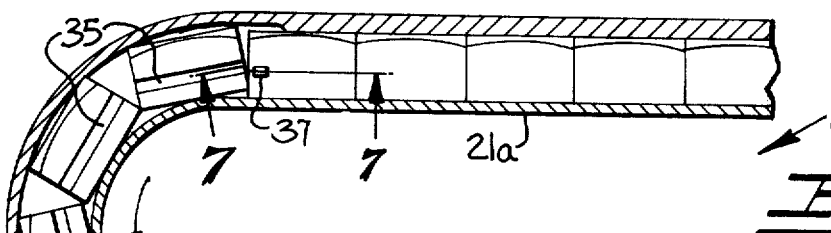
Fig-5
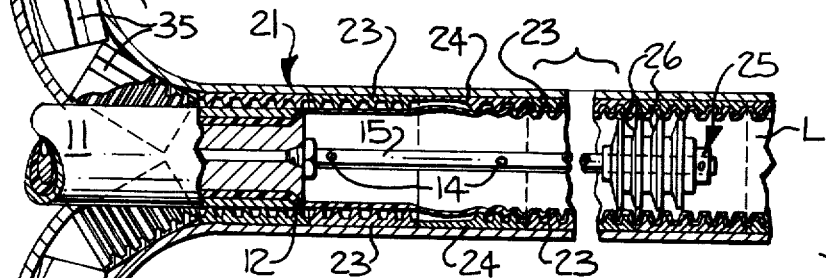
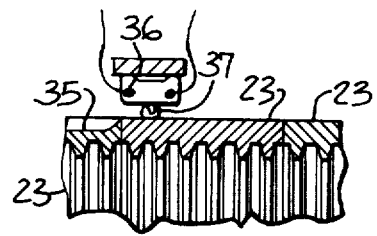
Fig-7
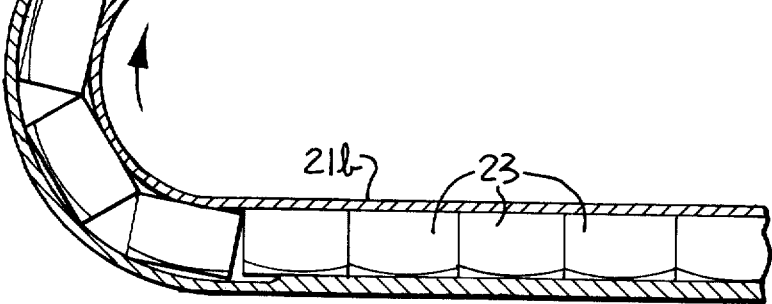

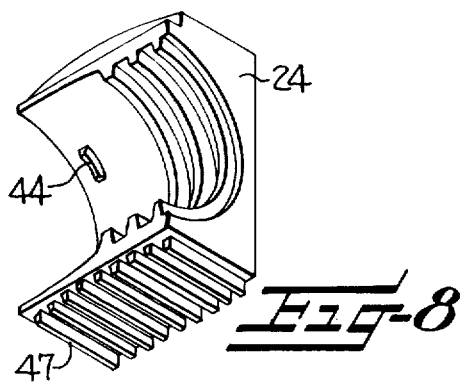
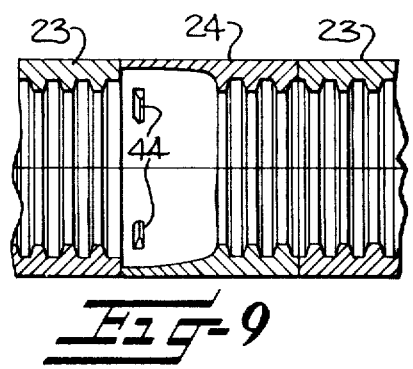
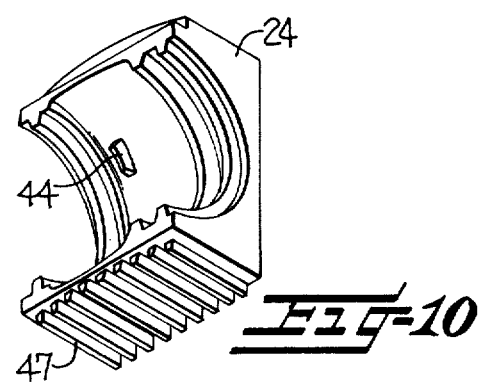
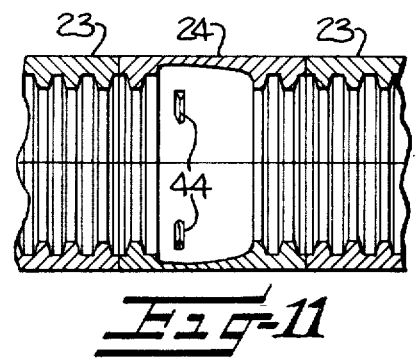
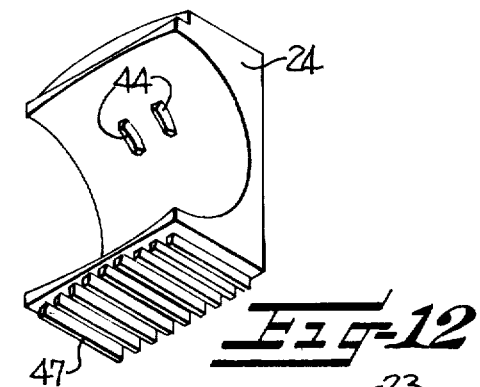
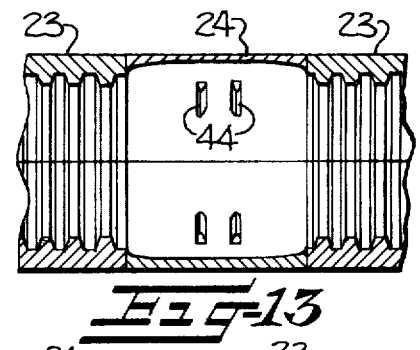
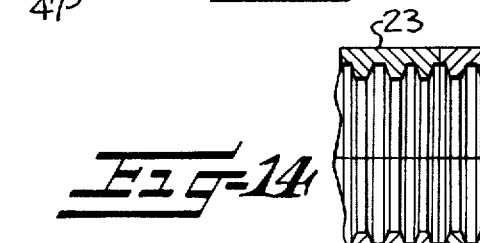
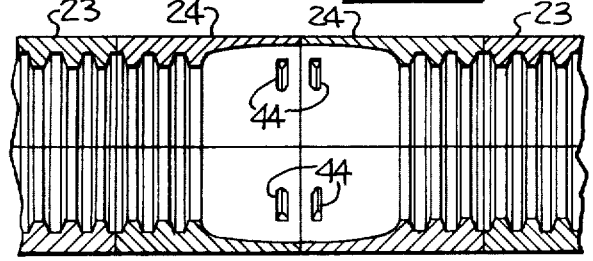
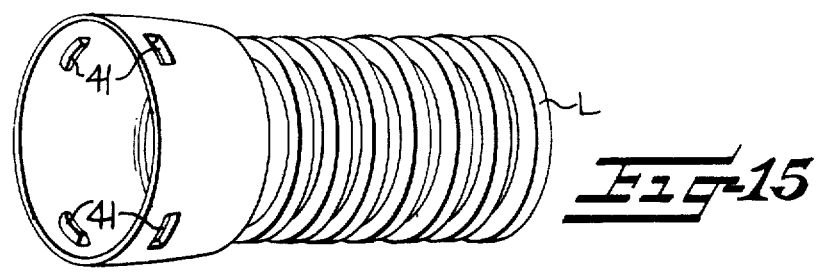

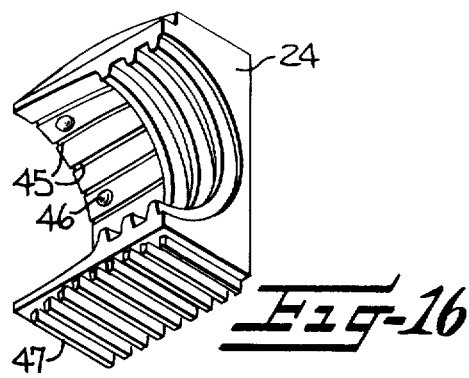
Fig-16
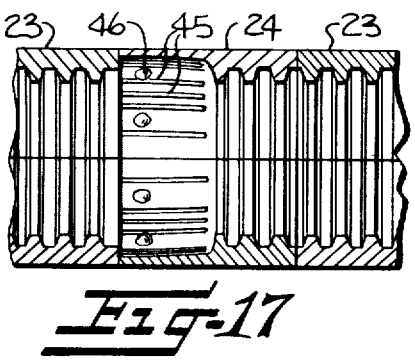
Fig-17
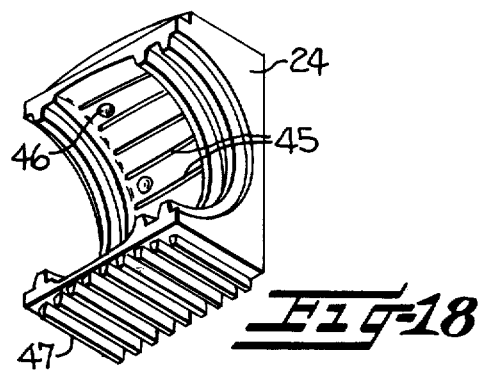
Fig-18
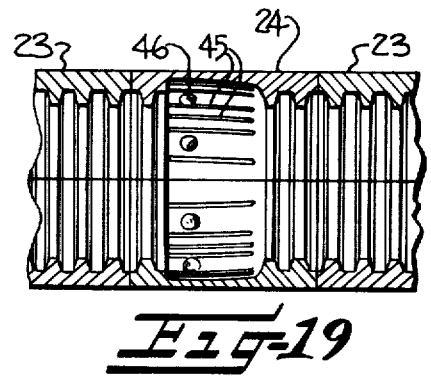
Fig-19
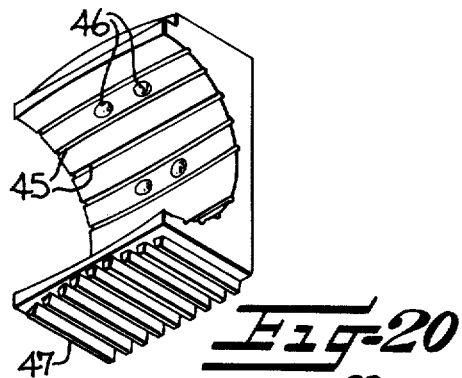
Fig-20
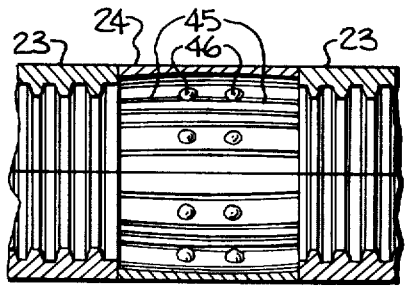
Fig-21
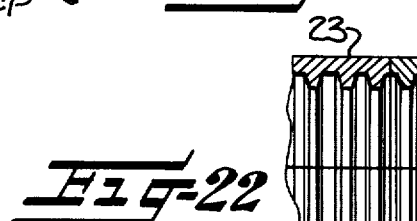
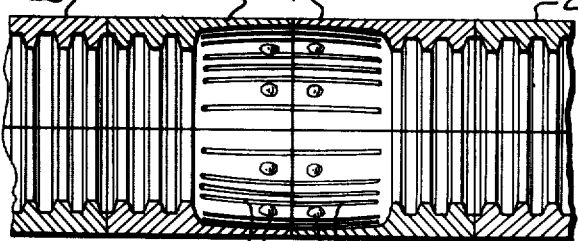
Fig-22
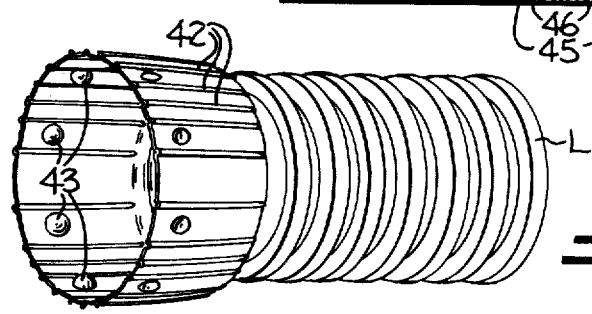
Fig-23

APPARATUS FOR MOLDING PLASTIC PIPE WITH ENLARGED PORTIONS FORMED THEREIN

This application is a division of my copending application Ser. No. 513,279, filed Oct. 9, 1974, entitled METHOD FOR MOLDING PLASTIC PIPE WITH ENLARGED PORTIONS FORMED THEREIN, which in turn is a continuation-in-part of my copending applications Ser. No. 271,225, filed July 13, 1972, entitled METHOD OF MAKING CORRUGATED PLASTIC PIPE WITH INTEGRAL COUPLER COLLARS now U.S. Pat. No. 3,891,733; and Ser. No. 316,825, filed Dec. 20, 1972, entitled APPARATUS FOR MAKING CORRUGATED PLASTIC PIPE WITH INTEGRAL COUPLER COLLAR, now U.S. Pat. No. 3,859,025.

This invention relates to molded plastic tubes, and it is a primary object of this invention to provide an improved apparatus for forming an elongate plastic tube by blow molding wherein enlarged portions are formed in the tube at spaced locations along the length of the tube.

In the two earliest filed aforementioned applications, a plastic tube is formed having successive closely spaced body portions of a predetermined size and configuration, with relatively enlarged sleeve portions being formed between and interconnecting the adjacent body portions. The tube is subsequently severed at each successive enlarged sleeve portion to form lengths of pipe having an enlarged sleeve portion at one end thereof, with the enlarged sleeve portion serving as an integral coupler collar for permitting easily interconnecting the pipe lengths.

In producing a tube of this configuration wherein enlarged sleeve portions are formed at spaced locations along the length of the tube, difficulties are sometimes experienced in obtaining properly formed enlarged portions in the tube, particularly where the plastic material used in forming the tubes is of less than optimum quality or contains impurities therein. These problems or difficulties are believed to be attributable to migration or shifting of the hot plastic material in the mold during processing which results in non uniformity of thickness of the plastic material. This may occur, for example, because of thinning out of the plastic material when the hot plastic tube is drawn or stretched to a reduced thickness to accommodate itself to the larger internal dimensions of the enlarged sleeve forming mold cavity. In such areas of reduced thickness, the internal pressure employed for blowing the plastic tube into conformity with the mold cavity apparently causes holes to be blown in weak areas of the reduced thickness portions, thus forming a defective or second quality product. Oftentimes the holes formed in the enlarged portions of the tube are so severe that the resulting loss of pressure within the tube causes the tube to collapse, requiring that the blow molding machine be stopped and the interior thereof cleared of plastic material prior to restarting. This time consuming operation involves considerable down time and loss of production.

These aforementioned problems are of particular concern where substantial shaping or molding of the hot plastic tube occurs in the smaller diameter portion of the tube, such as the annular corrugations in the body portion of a corrugated plastic tube, and wherein a lesser amount of molding or reshaping occurs in the enlarged areas of the tube, as for example an enlarged annular sleeve portion. The blow molding of the corrugated portion of a plastic tube requires substantial blowing pressure, since substantial amount of plastic material must be moved into conformity with the irregularly configured mold surfaces which form the corrugations in the tube.

In accordance with the present invention, I have found that the pressure required for molding the smaller diameter portions of the tube is generally too high for successfully blow molding relatively enlarged portions of the tube. This is particularly so where the elongate smaller diameter portions of the tube are irregularly configured and the relatively short enlarged diameter portions of the tube are comparatively less irregularly configured.

Moreover, I have found that the aforementioned problems may be overcome by periodically effecting a lower internal fluid pressure in the blow molding zone during certain critical times in the formation or molding of the enlarged sleeve portions of the tube. More particularly, it has been found that the problems of forming holes in enlarged sleeve portions of the tube may be overcome by effecting a lower internal fluid pressure in the hot plastic tube at least during reception of the hot plastic tube within the enlarged mold cavity and initial molding thereof.

In accordance with one aspect of the invention, this is accomplished by reducing the pressure of the fluid being supplied to the blow molding zone when the die blocks forming the enlarged sleeve-forming mold cavity arrive at a predetermined position immediately prior to receiving the hot plastic tube therein. This allows time for the internal pressure in the blow molding zone to bleed-off or fall to a sufficiently lower level before the enlarged sleeve portion of the tube is molded. Full pressure is again supplied to the blow molding zone when the die blocks forming the enlarged sleeve-forming mold cavity reach a predetermined downstream location in the blow molding zone after reception of the hot plastic tube within the sleeve-forming mold cavity but prior to the enlarged sleeve portion leaving the molding zone. Preferably, pressure in the blow molding zone is permitted to increase and approach the earlier higher level during the latter stages in the movement of the enlarged sleeve portion through the blow molding zone. It will thus be seen that the pressure exerted on the tube is lowest during the critical early formative stages of the enlarged sleeve portion when the tube is the hottest. After the enlarged sleeve has traveled a short distance downstream in the blow molding zone, it has cooled and hardened sufficiently to withstand higher internal pressures.

In accordance with a further aspect of the invention, it has been found that the aforementioned problem of forming holes in the enlarged portions of the pipe may be reduced by providing surface irregularities in the inner surfaces of the enlarged sleeve-forming mold cavity, which irregularities serve to anchor or stabilize the hot plastic material therein and avoid migration of the plastic and formation of weak areas of reduced thickness. Such surface irregularities may take several forms. For example, inward projections may be provided on the inner surfaces of the die blocks forming the enlarged mold cavity, which projections also serve for forming integral projections in the enlarged sleeve portions which serve as latching members for interconnecting a length of corrugated pipe cut from the thus molded tube within one of the enlarged sleeve portions of an adjacent like pipe.

Some of the features and advantages of the invention having been stated, others will become apparent from the following detailed description of several preferred embodiments of the invention, when taken in connection with the accompanying drawings, in which FIG. 1 is a schematic perspective view of an arrangement of apparatus for carrying out the method of this invention;

FIG. 2 is a schematic plan view of an extruder and blow molding machine showing an arrangement of die blocks in accordance with one embodiment of the invention for forming enlarged sleeve portions in the tube, and wherein two enlarged sleeve portions are molded in the tube during each complete revolution of the die blocks;

FIG. 3 is a schematic plan view similar to FIG. 2 showing an arrangement of die blocks in accordance with a second embodiment of the invention wherein a single enlarged sleeve portion is molded in the tube during each complete revolution of the die blocks;

FIG. 4 is a sectional plan view of a portion of the blow molding machine showing the sleeve-forming die blocks at a location just prior to receiving the hot plastic tube therein;

FIG. 5 is a sectional plan view of a portion of the blow molding machine showing the sleeve forming die blocks at a downstream position in the blow molding zone after receiving the hot plastic tube therein;

FIG. 6 is a fragmentary sectional view taken substantially along line 6—6 of FIG. 4 and showing the sensing device employed for periodically effecting lowering of the air pressure in the blow molding machine;

Fig. 7 is a view similar to FIG. 6 but taken along line 7—7 of FIG. 5 and showing the operation of the sensing device when the die blocks are in the position shown in FIG. 5;

FIG. 8 is an isometric view showing the concave inner mold surface of one type of sleeve-forming die block employed in accordance with the invention for forming enlarged sleeve portions in the tube for use as coupler collars, and also showing the underside of the die block, and wherein the enlarged sleeve-forming portion of the inner surface of the die block is located at one end of the block and wherein wedge-shaped projections extend inwardly from the enlarged sleeve-forming portion of the inner mold surface for forming corresponding projections in the sleeve;

FIG. 9 is a cross-sectional view showing the inner mold surfaces of a cooperating pair of the die blocks illustrated in FIG. 8;

FIG. 10 is an isometric view similar to FIG. 8 showing another type of sleeve-forming die block employed in accordance with the invention, wherein the enlarged sleeve-forming portion of the inner mold surface is located in a medical portion of the die block;

FIG. 11 is a cross-sectional view showing the inner mold surfaces of a cooperating pair of the die blocks illustrated in FIG. 10;

FIG. 12 is an isometric view showing the concave inner mold surface of another type of sleeve-forming die block employed in accordance with the invention and also showing the underside thereof, and wherein the entire inner mold surface of the die block defines the enlarged sleeve-forming mold cavity;

FIG. 13 is a cross-sectional view showing the inner mold surfaces of a cooperating pair of the die blocks illustrated in FIG. 12;

FIG. 14 is a cross-sectional view showing the inner mold surfaces of several cooperating pairs of die blocks, and wherein two cooperating pairs of die blocks of the type shown in FIG. 8 are arranged in abutting relation to define an enlarged sleeve-forming mold cavity suitable for forming a pair of coupler collars;

FIG. 15 is an isometric view of the corrugated pipe product with an integral coupler collar thereon as would be produced by any of the forms of cooperating die blocks of FIGS. 9, 11, 13 and 14;

FIGS. 16–22 correspond substantially to FIGS. 8–14 previously described, but illustrate die blocks in accordance with another form of the invention wherein longitudinal grooves are provided in the enlarged sleeve-forming portions of the mold surfaces, and the latching projections are in the form of a plurality of generally hemispherical projections; and FIG. 23 is an isometric view of the corrugated pipe product with an integral coupler collar thereon as would be produced by any of the forms of the cooperating pairs of mold blocks of FIGS. 17, 19, 21 and 22.

Referring more particularly to the drawings, an extruding machine 10 is arranged with the extruder head 11 thereof positioned to continuously extrude and feed a tube of hot plastic material into a blow molding machine, broadly designated at 20. Molding machine 20 is adapted for successively forming annular corrugations in the freshly extruded tube as the tube is received in the elongate blow molding zone thereof, broadly designated at 21, formed by a plurality of pairs of cooperating substantially semitubular mold sections or die blocks arranged in end-to-end relation in each of two cooperating endless series 21a, 21b. Conventional drive means, such as an electric motor 22, is provided for moving the two series of die blocks along respective endless paths with the proximal runs or reaches of such paths extending in a substantially straight path aligned with the extruder head 11 and forming the blow molding zone 21.

The die blocks in the two series 21a, 21b move forwardly together along the substantially straight molding zone 21 in abutting relation in cooperating pairs, with each cooperating pair forming a single mold cavity and with the cavities of all the abutting cooperating die blocks in the molding zone forming an elongate composite mold cavity. Pressure means, generally indicated at 30, to be described later, is provided communicating with the interior of the hot plastic tube in the blow molding zone for introducing compressed air or other fluid under pressure into the tube being extruded to expand and mold the tube against the wall of the composite mold cavity.

Most of the die blocks in the endless series 21a, 21b have irregularly configured concave inner mold surfaces in the form of annular corrugations of alternating ribs and valleys for forming annularly corrugated body portions in the tube being molded thereagainst. Such pairs of body-forming mold blocks are successively arranged in the respective endless series with the concave inner surfaces cooperating to define an elongate annularly corrugated mold cavity for forming elongate body portions of predetermined tubular dimension in the hot tube being molded thereagainst. However, at least one remaining cooperating pair of the die blocks, and preferably two of the remaining cooperating pairs of die blocks, have at least a portion of the concave inner mold surfaces thereof being of larger internal dimension than the inner surfaces of the irregularly configured body-forming mold blocks to thereby define an enlarged sleeve-forming mold cavity of greater diameter than the body-forming mold cavity for forming enlarged relatively short sleeve portions in the tube between adjacent corrugated body portions, with the sleeve portions having an inside diameter greater than the maximum outside diameter of the corrugated body portions.

When the die blocks in such an arrangement are moved in the series along their respective endless paths, they form a composite mold cavity of a configuration which molds the tube into a series of successive closely spaced elongate annularly corrugated tubular bodies with interconnecting relatively short enlarged sleeve portions between the adjacent corrugated tubular bodies.

The thus molded tube T is delivered from the molding zone 21 by the forwardly moving cooperating pairs of die blocks at a predetermined speed. The tube T is then fed forwardly from the molding zone through a speed control 50, through a work station 60, where, if desired, apertures may be formed in the tube, then through a cutting machine or station 70, and finally to a doffing and stacking station 80.

Work station 60 may be in the form of a drilling work station for drilling drainage holes at spaced intervals along and around the tube being fed therethrough. By way of example, the drilling work station may be of a general type disclosed in my U.S. Pat. No. 3,819,778, issued June 25, 1974 entitled METHOD OF MAKING AND PROCESSING CORRUGATED PLASTIC PIPE. Alternatively, work station 60 may be in the form of a slitting work station including a plurality of slitting saws or rotary cutting blades arranged around the tube and periodically moved into engagement with the tube for cutting slits in the valleys thereof. By way of example, the slitting work station may be of the general type disclosed in my U.S. Pat. No. 3,831,470, issued Aug. 27, 1974, entitled METHOD AND APPARATUS FOR FORMING SLITS IN TUBES. As is well known, it is customary to provide round drainage holes in corrugated plastic piping used for septic tank fields or other drainage systems, and it is customary to provide a circularly arranged series of arcuate slits, usually in alternate valleys, in a corrugated tube used for an underground irrigation system. Accordingly, a detailed illustration of the work station 60 or either of its embodiments is deemed unnecessary for the purpose of this disclosure.

A speed control or tension sensing device 50 is provided between the molding machine 20 and work station 60 for controlling the rate of feed of the tube through the work station 60. The tube T emerging from the molding zone 21 is still in a heated condition as it passes through the work station 60 and has not entirely hardened at this point in the process. Accordingly, it is desirable to avoid stretching the tube lengthwise as well as to avoid compressive shortening of the tube. Speed control 50 is adapted to synchronize the rate of feed of the tube T through work station 60 with the delivery rate of the tube T as it emerges from the mold zone 21. This permits obtaining a final tube product having a substantially uniform number of ribs and valleys per unit length thereof.

Referring more specifically to the speed control 50, as shown in FIG. 1, it includes a tension sensing arm 51 which engages tube T at a point between molding machine 20 and work station 60. A drive means 61, located in work station 60 for forwardly moving the tube therethrough, is operatively connected to the tension sensing arm in such a manner that the speed of the drive means 61 is varied in accordance with the variations in tension sensed by tension sensing arm 51. A further detailed disclosure of a tension sensing device of this general type may be found in my U.S. Pat. No. 3,799,418, issued Mar. 6, 1974, entitled APPARATUS AND METHOD FOR POSITIVELY FEEDING CORRUGATED PIPE.

Cutting station 70 includes a motorized saw 71 adapted for cutting the tube into predetermined lengths as it moves through the cutting station. As illustrated, a sensing switch 72 is positioned a predetermined distance downstream from the cutting blade of motorized saw 71. This distance essentially corresponds to the desired length of the tube to be cut so that as the molded tube passes through the cutting station 70, the leading end of each successive length deflects the sensing switch 72 and actuates motorized saw 71. As is conventional, motorized saw 71 is adapted to move longitudinally downstream with the forwardly moving tube during the cutting operation, and upon the cutting being completed to return upstream to the original position ready for the next successive cutting operation.

As each successive length of the tube is cut, it is advanced forwardly of the saw 71 and proceeds onto a supporting trough means 81 of the doffing and stacking station 80. Supporting trough means 81 is located in substantial alignment with the path of travel of the corrugated tube throughout its movement from the molding machine 20 through cutting station 70. Each successive cut length of tube is advanced onto the supporting trough means 81 by the leading end of the uncut tube pushing the trailing end of the previously cut length of pipe. As each successive length approaches the end of the supporting trough means 81, it engages a finger 82 of doffing switch 83. Doffing switch 83 is operatively connected through suitable doffing controls 84 to actuate a pair of outwardly diverging doffer arms 85 projecting upwardly near each end of the doffing station. As each successive length of pipe is fully received in the doffing station, the doffer arms eject the pipe laterally into either of two hoppers 86, 87 which are positioned adjacent each side of the path of travel of the advancing pipes. A predetermined number of pipes are then accumulated in the hopper in stacked and nesting relation where they may be subsequently secured into bundles by tieing with cord or other flexible binding elements.

Referring again to the blow molding machine 20, FIG. 2 illustrates one arrangement of the die blocks thereof whereby two successive sleeve portions are formed in the tube during each complete cycle or revolution of the die blocks in the endless series. As illustrated, the die blocks in each endless series are arranged in abutting relation with certain adjacent body-forming die blocks, indicated at 23, being spaced apart to receive therebetween a single sleeve-forming die block, indicated at 24, with its opposite ends abutting the adjacent spaced apart body forming die blocks 23. As illustrated in FIG. 2, each endless series includes two sleeve forming die blocks 24 which are located at opposite respective ends of each series with an equal number of abutting body-forming die blocks 23 intervening between each sleeve-forming die block in the series. Thus, one complete revolution of the die blocks in their respective endless paths will form a length of tube having two enlarged sleeves formed therein, which may be subsequently severed along the cut lines illustrated in FIG. 2 to form two substantially identical lengths L of pipe, each having an elongate irregularly configured or corrugated body portion and a relatively short enlarged coupler collar or sleeve at one end thereof.

In accordance with a second embodiment of the invention, as illustrated in FIG. 3, each endless series includes two sleeve-forming die blocks 24 positioned in abutting side-by-side relation with the remaining die blocks in the series being abutting body-forming die blocks 23. Thus, according to this embodiment, a complete revolution of the die blocks in their respective endless paths will form an elongate irregularly configured body portion and a single relatively short enlarged sleeve portion. As illustrated, the enlarged sleeve portion may be severed intermediate its opposite ends along the cut lines shown to form a pair of coupler collars, and the elongate irregularly configured body portion may also be severed at a location midway between successive enlarged sleeve portions to thereby form two successive lengths of pipe L1 and L2, each having an enlarged coupler collar on one end thereof, with alternating lengths of pipe L1 having the coupler collar on the leading end of the pipe as it emerges from the cutting station, and with intervening lengths L2 having the coupler collar on the trailing end of the pipe.

As noted earlier, when the extruded tube of hot plastic material is molded into conformity with the mold cavity in the blow molding zone by applications of internal fluid pressure in the tube, the thickness of the plastic material is necessarily stretched or thinned out as the predetermined diameter plastic tube accommodates itself to the larger diameter of the sleeve-forming mold cavity. As discussed previously, this sometimes results in the formation of holes in the enlarged sleeve portions, apparently due to migration or uneven thinning out of the plastic material in these areas, or due to the presence of impurities in these reduced thickness areas, with the result that the fluid pressure employed for molding the irregularly configured portions of the tube blows holes in these reduced thickness areas.

To avoid blowing holes in the tube and to form more uniformly shaped enlarged sleeves, the fluid pressure means 30 employed in association with the blow molding machine is adapted to provide a reduced level of fluid pressure in the molding zone during certain critical times during the formation of the enlarged sleeve portions of the tube. More particularly, as illustrated, a suitable fluid pressure source 31 such as an air compressor, is connected to the blow molding machine through suitable piping and controls to be described presently, so that the pressure of the fluid being supplied to the interior of the hot plastic tube in the blow molding zone is reduced as the enlarged sleeve-forming die blocks reach a position just prior to receiving the hot plastic tube therein, and this reduced pressure is maintained for a predetermined time during engagement and initial formation of the hot plastic tube against the enlarged sleeve-forming mold cavity. The reduced pressure is significantly less than the pressure supplied to the blow molding zone during molding of the corrugated body portion of the tube, and for example, may suitably be about one half or less than one half of higher pressure supplied to the blow molding zone.

As illustrated schematically in FIGS. 1–3, a pipeline 32 connects the fluid pressure source 31 to extruder 10, with the pipeline including parallel branch portions 32a and 32b. The extruder 10 has an air passageway 13 extending through the extrusion head 11 and communicating with the interior of the hot plastic tube being molded for conveying the pressurized fluid from pipeline 32 to the interior of the hot plastic tube in the blow molding zone. As illustrated, each branch 32a, 32b of pipeline 32 has an adjustable air regulator 33a, 33b connected thereto for maintaining a predetermined adjusted air pressure from the respective pipeline branches. Additionally, a solenoid operated valve 34 in one of the pipeline branches 32b is adapted to periodically interrupt fluid communication through the branch 32b in response to a sensing means, to be described presently. In operation, regulator 33a is adjusted for supplying a continuous predetermined relatively low pressure to the blow molding zone, while regulator 33b is adjusted for delivering a relatively high fluid pressure therefrom. Thus, when valve 34 is in an open position, the pressure being supplied to the interior of the tube in blow molding zone 21 corresponds substantially to the relatively high pressure being delivered from regulator 33b, while valve 34 is closed, the pressure being supplied to the molding zone corresponds to the low pressure from regulator 33a. The actual pressures supplied to the tube from the respective high and low pressure supplies may vary widely depending upon various factors such as the type and quality of the plastic material being extruded and molded, the temperature and speed of operation, and the amount of pressure leakage past the plug assembly located interiorly of the tube at the downstream end of the blow molding zone. For example, as is well known, the sealing means in the plug assembly of the molding machine wears during continued operation of the molding machine. As the sealing means becomes increasingly worn, the increased leakage past the plug generally requires that the supply pressure be increased so as to maintain adequate pressure in the blow molding zone. It will thus be understood that the actual pressure in the blow molding zone does not always correspond exactly to the pressure of the air being supplied to the blow molding zone, but is often somewhat lower.

By way of example, typical high and low supply pressures employed in molding a 4 inch nominal diameter corrugated tube of high density polyethylene may range from about 16 psi and 2 psi when the sealing means in the plug assembly is relatively new to a high and low of about 60 psi and 15 psi when the sealing means is worn and ready for replacement.

Control over the opening and closing of valve 34 is accomplished by a sensing means adapted to sense the location of the sleeve-forming die blocks in the endless series and to open and close valve 34 at appropriate times during movement of the sleeve-forming die blocks in the endless series. More particularly, an indicator means in the form of an elongate groove 35 is provided in the upper surface of certain successive mold blocks in the series extending longitudinally of the mold blocks. A sensing switch 36 is located at an accessible location on one of the endless series of die blocks and has a sensing feeler or wand 37 which engages the upper surface of the moving die blocks and senses when the indicator groove passes therebeneath. As illustrated, groove 35 is provided in four successive body-forming die blocks and serves to maintain the pressure being supplied to the molding zone at a reduced level during a time corresponding to the passage of four successive die blocks.

Preferably, the pressure of the fluid being supplied to the molding zone is reduced prior to the arrival of the enlarged sleeve-forming die blocks in position for receiving the hot plastic tube therein. This is to allow sufficient time for the pressure in the molding zone to fall to the desired lower level prior to the enlarged sleeve-forming die blocks receiving the hot plastic tube therein, since there is necessarily a time lag between the reduction of the supply pressure and the actual falling of the pressure in the molding zone to the predetermined lower pressure. Similarly, application of full pressure to the molding zone is restored when the enlarged sleeve-forming die blocks reach a predetermined downstream position in the blow molding zone prior to the sleeve-forming die blocks leaving the blow molding zone 21. Preferably, this predetermined downstream position is only a short distance from the upstream end of the molding zone, so that full pressure is restored in the molding zone prior to the enlarged sleeve portion leaving the downstream end of the molding zone.

A portion of the upstream end of blow molding machine 20 is shown in detail in FIG. 4. As illustrated, the pairs of cooperating die blocks meet in cooperating relation on opposite sides of the tubular exterior surface of extruder head 11 which extends into the blow molding machine from extruder 10 and conveys hot plastic material in a plasticized state to the blow molding machine 20. As the cooperating pairs of die blocks move downstream, to the right as illustrated in FIG. 4, the hot plastic material is extruded in the form of a tube from an annular extrusion orifice or die 12 onto the inner peripheral surfaces of the forwardly moving die blocks. It will be seen that the diameter of the extruded plastic tube is no greater than the smallest internal diameter of the mold cavity defined by the cooperating die blocks. As the freshly extruded tube moves downstream with the forwardly moving die blocks, the internal pressure in the blow molding zone 21 molds the plastic material into conformity with the configuration of the inner mold surfaces of the die blocks.

Fluid pressure in the molding zone is supplied through a passageway 13 in the extrusion head 11 and is delivered into the blow molding zone through opening 14 in an axially extending support rod 15 which extends downstream from the extrusion head 11. The downstream end of the blow molding zone 21 is defined by a plug assembly 25 which is slidably carried by rod 15 and which includes a plurality of flexible sealing rubbers 26 which seal against the inner surface of the tube and serve to maintain the pressurized fluid in the tube. As illustrated, during normal operation of the molding machine, plug assembly 25 is located near the downstream end of the opposing series of die blocks just prior to where the cooperating pairs of die blocks separate to make their return trip upstream. Upon initial start-up, plug assembly 25 is located at the upstream end of the molding zone adjacent the output of the extruder. After receiving the extruded tube therearound the plug is carried by the air pressure and by the forward movement of the mold blocks to its normal operating position adjacent the downstream end of the blow molding zone.

If the tube collapses in the blow molding zone for any reason, as occurs most typically because of loss of internal pressure in the tube due to formation of a hole in the wall thereof, it is necessary, in order to restart the molding machine, to clear the molding zone of plastic material and to move the molding machine away from the extruder head to provide access to the plug assembly 25. The plug assembly is then repositioned upstream adjacent the extruder head for receiving the extruded tube. Obviously, this is a difficult operation and involves considerable machine down time and loss of production. By avoiding the formation of holes in the enlarged sleeve portions, the present invention considerably increases the production efficiency of the molding machine.

As illustrated in FIG. 4, the sleeve-forming die block 24 is at an upstream location just prior to receiving the hot plastic tube therein. When the sleeve-forming die block 24 reaches this position, the elongate groove 35, which, as illustrated, is provided in four successive body-forming die blocks located downstream from the sleeve-forming die block 24, has just arrived beneath the sensing switch 36, and the sensing feeler or wand 37 thereof has descended into the groove to thereby cause reduction of the fluid pressure being supplied to the blow molding zone.

FIG. 5 illustrates the same blow molding machine a short interval of time later when the sleeve-forming die block 24 has traveled downstream into the blow molding zone 21. As illustrated in FIG. 5, the hot plastic tube is in engagement with the enlarged sleeve-forming mold cavity and the internal pressure therein has begun to mold or stretch the hot tube into conformity with the enlarged sleeve-forming mold cavity. By the time the enlarged sleeve-forming mold cavity has traveled a short distance downstream from the extrusion die, the plastic material has cooled sufficiently to withstand an increased pressure. Thus, as seen from FIG. 7, when the sleeve-forming die block 24 reached the position illustrated in FIG. 5, the elongate groove 35 has ended and the sensing wand 37 of switch 36 has risen to thereby open valve 34. Thus, the pressure being supplied to the blow molding zone is restored to the original full pressure. From the foregoing, it will be appreciated that full pressure is applied to the enlarged sleeve portion during a substantial portion of its travel through the blow molding zone, but that during the critical initial formative stages of the enlarged sleeve portion the pressure applied thereto is at a reduced level.

The enlarged sleeve portions formed in the tube in accordance with this invention may take various forms and shapes with two preferred forms of an enlarged sleeves being disclosed herein in detail. For example, in accordance with one preferred form, the enlarged sleeve portions are relatively smooth and non-corrugated as compared to the annularly corrugated body portions of the tube, with such enlarged sleeve portions being adapted to serve as integral coupler collars at one end of successive lengths of corrugated pipe cut from the tube, such as is illustrated in FIG. 15, to facilitate interconnecting other like corrugated pipes therewith. In this regard, opposing pairs of wedge-shaped latching members 41 (FIG. 15) are provided on the coupler collar extending radially inwardly from the relatively smooth inner surfaces thereof which are adapted to engage the corrugations on the opposite end of a like pipe positioned in the coupler collar and releasably retain the same in the collar. Another form of enlarged coupler collar or sleeve produced in accordance with this invention is illustrated in FIG. 23. As illustrated, the sleeve portion is provided with arcuately spaced axially extending ridges 42 on the exterior surface thereof and with correspondingly shaped grooved recesses on the inner surface thereof. Further, the latching members 43 are in the form of a circularly arranged series of hemispherical-shaped projections.

The sleeve-forming die blocks employed for forming the enlarged sleeve portions in the tube may, by way of example, be of the general type disclosed and claimed in my U.S. Pat. No. 3,792,941, issued Feb. 19, 1974 entitled MOLD BLOCKS FOR FORMING COUPLER COLLAR INTEGRAL WITH PIPE. Referring more particularly to the sleeve-forming die blocks, as illustrated in FIGS. 8 and 9, they may have a portion of the inner surface thereof at one end of the block of enlarged diameter and relatively smooth configuration as compared to the corrugated remaining portion of the mold surface, with wedge-shaped projections 44 extending from the smooth diameter portion for forming the latching members 41 thereagainst. These projections have been found to additionally serve as anchor points for the hot plastic tube to immobilize the tube in the enlarged sleeve-forming mold cavity and prevent migration thereof to thereby help avoid forming unduly thin or weak areas in the enlarged sleeve portions.

FIGS. 10 and 11 illustrate a similar sleeve-forming die block except that the enlarged diameter sleeve-forming portion thereof is located in a medial portion of the block with annular ribs and valleys being provided on opposite sides thereof for forming corrugations thereagainst.

FIGS. 12 and 13 illustrate a still further form of mold block wherein the entire axial length of the concave inner surface is of enlarged diameter as compared to the body-forming die blocks so as to form an enlarged sleeve of approximately twice the axial length as that formed by the mold blocks of FIGS. 8-11. In this embodiment, two sets of opposing pairs of spaced projections 44 are provided in the medial portion of the mold surface for forming latching members 41 in the enlarged sleeve portion being molded thereagainst. The enlarged sleeve is adapted for being severed intermediate its opposite ends to form a pair of enlarged coupler collars for interconnecting other pipes therewith.

A similar type of double coupler may be formed by the arrangement of mold blocks shown in FIG. 14 wherein two cooperating pairs of sleeve-forming mold blocks of the type illustrated in FIG. 8 are positioned with the enlarged sleeve-forming portions thereof in abutting relation and wherein the enlarged sleeve produced thereby may be severed to form a pair of coupler collars.

Enlarged sleeve portions of the form illustrated in FIG. 23 may be produced by the various types of sleeve-forming die blocks illustrated in FIGS. 16–22. Like the previously described types of sleeve-forming die blocks, the enlarged sleeve-forming mold cavity may be located at various axial positions in the die block. For example, the sleeve-forming portion may be located at one end of the block (FIG. 16), in a medial portion thereof (FIG. 18) or over the entire surface thereof (FIG. 20). Additionally, the enlarged sleeve portion may form a single coupler collar in the tube (FIGS. 16–19) or a pair of end-to-end coupler collars in the tube (FIGS. 20-22). It will be seen that each of the die blocks has a plurality of longitudinally extending grooves 45 over the enlarged sleeve-forming mold surface for forming the ridges 42 on the exterior surface of the sleeve portions. Also, the latching members 43 in the sleeve portions of the tube are formed by a circularly arranged series of generally hemispherical projections 46 carried by and extending inwardly from the sleeve-forming mold surface of the die block.

It will be seen that the underside of all of the die blocks illustrated is provided with a series of parallel gear teeth 47. As described in my aforementioned U.S. Pat. No. 3,792,941, such teeth 47 serve to permit moving the die blocks in their endless series upon engagement by the drive means 22 (FIG. 1) of the blow molding machine.

In the drawings and specification, there have been set forth preferred embodiments of the invention, and although specific terms are employed, they are used in a generic and descriptive sense only and not for purposes of limitation.

That which is claimed is:

1. In a blow molding apparatus for molding a plastic tube having spaced apart enlarged sleeve portions formed therein along its length, said apparatus including an extruder for continuously extruding hot plastic material in the form of a tube, an endless series of cooperating pairs of forwardly moving die blocks defining a blow molding zone for receiving and molding the tube of hot plastic material, most of the cooperating pairs of die blocks being body-forming die blocks having concave inner surfaces defining a body-forming mold cavity for molding the tube into body portions of predetermined tubular dimension, at least one of the cooperating pairs of die blocks being sleeve-forming die blocks having concave inner surface portions of larger internal dimension than the inner surfaces of said body-forming die blocks and defining an enlarged mold cavity for molding enlarged sleeve portions in the tube between adjacent body portions, and means for supplying internal fluid pressure in the hot plastic tube during forward movement of the same through said blow molding zone to expand and mold the hot tube against said body-forming and sleeve-forming mold cavities, the improvement comprising means for automatically effecting lowering of the internal fluid pressure in the hot plastic tube for a short period of time each time said enlarged sleeve-forming mold cavity is in a predetermined location during molding of the tube therein to thereby avoid blowing holes in the hot plastic tube as the hot tube is stretched and expanded to conform with the enlarged sleeve-forming mold cavity and form enlarged portions in the tube.

2. In an apparatus according to claim 1, wherein said means for effecting lowering of the internal fluid pressure in said hot plastic tube comprises means operable for reducing the pressure of the fluid being supplied to the tube in response to the arrival of said sleeve-forming mold cavity at a position immediately prior to receiving said hot plastic tube therein.

3. In an apparatus according to claim 2, wherein said means for effecting lowering of the internal fluid pressure also includes means operable for restoring the full application of said internal fluid pressure to said tube in response to the arrival of said sleeve-forming mold cavity at a predetermined downstream position in said blow molding zone after receiving said hot plastic tube therein.

4. In a blow molding apparatus for molding a corrugated plastic tube having spaced apart enlarged sleeve portions formed therein along its length, said apparatus including an extruder for continuously extruding hot plastic material in the form of a tube, an endless series of cooperating pairs of forwardly moving die blocks defining a blow molding zone for receiving and molding the tube of hot plastic material, most of the cooperating pairs of die blocks being body-forming die blocks having annularly corrugated concave inner surfaces defining a body-forming mold cavity for molding the tube into corrugated body portions of predetermined diameter, at least one of the cooperating pairs of die blocks being sleeve-forming die blocks having concave inner surface portions of larger internal diameter than the inner surfaces of said body-forming die blocks and defining an enlarged mold cavity for molding enlarged sleve portion in the tube between adjacent body portions, and means for supplying internal fluid pressure in the hot plastic tube during forward movement of the same through said blow molding zone to expand and mold the hot tube against said body-forming and sleeve-forming mold cavities, the improvement comprising means for automatically effecting a lowering of the internal fluid pressure in the hot plastic tube for a short period of time at least during reception of the tube within said enlarged sleeve-forming mold cavity so as to avoid blowing holes in the hot plastic tube as the hot tube is stretched and expanded to conform with the enlarged sleeve-forming mold cavity and form enlarged portions in the tube.

5. In an apparatus according to clam 4, wherein said means for effecting a lowering of the internal fluid pressure in the hot plastic tube at least during reception of the tube within the enlarged sleeve-forming mold cavity includes means for sensing the presence of said sleeve-forming die blocks in a predetermined zone beginning just prior to the arrival of said sleeve-forming die blocks at the upstream end of said blow molding zone for receiving said hot plastic tube therein and ending at a predetermined downstream position in said blow molding zone after receiving said hot plastic tube therein, and means responsive to said last-recited means sensing the presence of said sleeve-forming die blocks in said predetermined zone for reducing the pressure of the fluid being supplied to the hot plastic tube.

6. Apparatus according to claim 5, wherein said means for sensing the presence of said sleeve-forming die blocks in said predetermined zone comprises indicator means carried by certain of said forwardly moving die blocks, and means mounted adjacent to the moving die blocks and cooperating therewith for sensing the passage of said indicator means thereby.

7. In a blow molding apparatus for molding a corrugated plastic tube having spaced apart enlarged sleeve portions formed therein along its length, said apparatus including an extruder for continuously extruding hot plastic material in the form of a tube, a plurality of cooperating pairs of forwardly moving die blocks defining a blow molding zone for receiving and molding the tube of hot plastic material, said cooperating pairs of die blocks being arranged in opposing endless series, most of the cooperating pairs of die blocks being body-forming die blocks having annularly corrugated concave inner surfaces defining a body-forming mold cavity for molding the tube into corrugated body portions of predetermined diameter, at least one of the cooperating pairs of die blocks being sleeve-forming die blocks having concave inner surface portions of larger internal diameter than the inner surfaces of said body-forming die blocks and defining an enlarged mold cavity for molding enlarged sleeve portions in the tube between adjacent body portions, and means for supplying internal fluid pressure in the hot plastic tube during forward movement of the same through said blow molding zone to expand and mold the hot tube against said body-forming and sleeve-forming mold cavities, the improvement wherein said means for supplying internal pressure in the hot plastic tube comprises means for normally supplying fluid to the interior of the tube at a predetermined relatively high pressure, and for at times supplying fluid to the interior of the tube at a predetermined relatively low pressure, and wherein control means is provided cooperating with said pressure supplying means and operating in timed relation with the movement of said sleeve-forming die blocks toward and into said blow molding zone for causing said fluid to be supplied to said tube at said relatively low pressure for a short period of time to lower the internal pressure in the tube so as to avoid blowing holes in the hot plastic tube as the hot tube is stretched and expanded to conform with the enlarged sleeve-forming mold cavity and form enlarged sleeve portions in the tube.

8. In a blow molding apparatus according to claim 7 wherein said means for normally supplying fluid to the tube at a predetermined relatively high pressure and for at times supplying fluid to the tube at a predetermined relatively low pressure includes respective high pressure and low pressure fluid supply lines, each communicating with the interior of said tube, said low pressure supply line continuously communicating with said tube, and valve means associated with said high pressure supply line for periodically interrupting the flow of fluid therethrough to said tube.

9. In a blow molding apparatus according to claim 8 wherein said control means includes a longitudinally extending groove provided in the exterior surface of certain successive die blocks in one of said endless series, and a switch operatively connected to said valve means and cooperating with the exterior surface of the die blocks in said one endless series for sensing the passing of said groove thereby and effecting closing of said valve means in response thereto.

* * * * *

UNITED STATES PATENT OFFICE
CERTIFICATE OF CORRECTION

PATENT NO. : 4,003,685
DATED : January 18, 1977
INVENTOR(S) : Ernest J. Maroschak It is certified that error appears in the above–identified patent and that said Letters Patent are hereby corrected as shown below:

Column 1, Line 8, after "THEREIN" insert --Now Pat. No. 3,919,367--
Column 7, Line 36, "applications" should be --application--.
Column 10, Line 55, "an" should be --the--
Column 13, Line 34, "clam" should be --claim--

Signed and Sealed this

Fifth Day of April 1977

[SEAL]

Attest:

RUTH C. MASON
Attesting Officer

C. MARSHALL DANN
Commissioner of Patents and Trademarks